(12) United States Patent
Solie et al.

(10) Patent No.: US 8,407,604 B2
(45) Date of Patent: Mar. 26, 2013

(54) MESSAGING SYSTEM AND METHOD

(75) Inventors: Kevin Solie, Lexington, KY (US); Subhashini Srinivasan, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 12/346,127

(22) Filed: Dec. 30, 2008

(65) Prior Publication Data

US 2010/0169793 A1 Jul. 1, 2010

(51) Int. Cl.
G06F 3/00 (2006.01)
(52) U.S. Cl. ........................................................ 715/753
(58) Field of Classification Search ................... 715/753
See application file for complete search history.

(56) References Cited

U.S. PATENT DOCUMENTS

| | | | |
|---|---|---|---|
| 7,130,403 B2 * | 10/2006 | Caspi et al. | 379/202.01 |
| 7,218,943 B2 | 5/2007 | Klassen et al. | |
| 7,707,226 B1 * | 4/2010 | Tonse | 707/796 |
| 7,983,704 B2 | 7/2011 | Weigele | |
| 7,991,271 B2 | 8/2011 | Candelore | |
| 8,020,002 B2 | 9/2011 | Lapstun et al. | |
| 8,028,161 B2 | 9/2011 | Kroselberg | |
| 8,209,624 B2 | 6/2012 | Hally et al. | |
| 8,234,706 B2 | 7/2012 | Zhang et al. | |
| 8,254,884 B2 | 8/2012 | Kahandaliyanage | |
| 8,259,858 B2 | 9/2012 | Ruelke et al. | |
| 2002/0073117 A1 * | 6/2002 | Newman | 707/513 |
| 2002/0192631 A1 * | 12/2002 | Weir et al. | 434/350 |
| 2003/0023684 A1 * | 1/2003 | Brown et al. | 709/204 |
| 2003/0210265 A1 | 11/2003 | Haimberg | |
| 2005/0005244 A1 * | 1/2005 | Chesley et al. | 715/751 |
| 2005/0120108 A1 * | 6/2005 | Wisniewski et al. | 709/224 |
| 2005/0235034 A1 * | 10/2005 | Chen et al. | 709/206 |
| 2005/0262203 A1 | 11/2005 | Buchheit et al. | |
| 2006/0010217 A1 * | 1/2006 | Sood | 709/206 |
| 2006/0173824 A1 | 8/2006 | Bensky et al. | |
| 2006/0173961 A1 | 8/2006 | Turski et al. | |
| 2006/0277210 A1 * | 12/2006 | Starbuck | 707/102 |
| 2007/0028171 A1 * | 2/2007 | MacLaurin | 715/705 |
| 2007/0047697 A1 | 3/2007 | Drewry et al. | |
| 2007/0226204 A1 | 9/2007 | Feldman | |
| 2007/0300169 A1 * | 12/2007 | Jones et al. | 715/764 |
| 2008/0082607 A1 * | 4/2008 | Sastry et al. | 709/204 |
| 2008/0109406 A1 * | 5/2008 | Krishnasamy et al. | 707/3 |
| 2008/0141146 A1 * | 6/2008 | Jones et al. | 715/753 |
| 2008/0189331 A1 * | 8/2008 | Lee et al. | 707/104.1 |
| 2008/0189375 A1 * | 8/2008 | Chi et al. | 709/206 |
| 2008/0208994 A1 * | 8/2008 | Chi et al. | 709/206 |
| 2010/0036856 A1 * | 2/2010 | Portilla | 707/100 |

FOREIGN PATENT DOCUMENTS

CN 200910222074.9 A 6/2012

* cited by examiner

Primary Examiner — Tadeese Hailu
Assistant Examiner — Eric J Bycer
(74) Attorney, Agent, or Firm — Holland & Knight LLP; Brian J. Colandreo, Esq.; Rory E. Foster, Esq.

(57) ABSTRACT

A method, computer program product, and computing system for defining text to be included within a first text message. One or more tags are assigned to the first text message. The one or more tags are chosen from a plurality of available tags. The first text message, including the text and the one or more tags, is transmitted to one or more recipients.

20 Claims, 3 Drawing Sheets

MESSAGING SYSTEM AND METHOD

TECHNICAL FIELD

The present disclosure relates to messaging systems and, more particularly to messaging systems that allow for the tagging of messages.

BACKGROUND

Real-time online collaboration applications are often used to allow for the simplified and instantaneous exchange of ideas. Examples of such include but are not limited to Microsoft Instant Messanger™, Lotus Sametime™, and WebEx™. Unfortunately, the manner in which data is presented to a user of such a real-time online collaboration application is often in an unorganized fashion. For example, there is often a need to present valuable information to the end user without cluttering the user interface. Given the limited size and the two dimensional nature of the computer screen, it is often difficult to give users an optimal view of the content being presented while also arranging information about people, events and messages in a manner that is conducive to efficiency.

SUMMARY OF THE DISCLOSURE

In a first implementation, a method includes defining text to be included within a first text message. One or more tags are assigned to the first text message. The one or more tags are chosen from a plurality of available tags. The first text message, including the text and the one or more tags, is transmitted to one or more recipients.

One or more of the following features may be included. The one or more tags may include a metadata-based tag. The plurality of available tags may include one or more of: a person tag, a handraise tag, a chat tag, a minute tag, a question tag, and a scribe tag. A plurality of text messages may be displayed. The plurality of text messages may include the first text message. The plurality of text messages may be filtered in accordance with one or more of the plurality of available tags. At least a portion of the plurality of text messages may be displayed using a display template, wherein the display template is chosen from a plurality of available display templates. The plurality of available display templates may include one or more of: a summary mode display template, a standard mode display template, and a detail view mode display template.

In another implementation, a computer program product resides on a computer readable medium that has a plurality of instructions stored on it. When executed by a processor, the instructions cause the processor to perform operations including defining text to be included within a first text message. One or more tags are assigned to the first text message. The one or more tags are chosen from a plurality of available tags. The first text message, including the text and the one or more tags, is transmitted to one or more recipients.

One or more of the following features may be included. The one or more tags may include a metadata-based tag. The plurality of available tags may include one or more of: a person tag, a handraise tag, a chat tag, a minute tag, a question tag, and a scribe tag. A plurality of text messages may be displayed. The plurality of text messages may include the first text message. The plurality of text messages may be filtered in accordance with one or more of the plurality of available tags. At least a portion of the plurality of text messages may be displayed using a display template, wherein the display template is chosen from a plurality of available display templates. The plurality of available display templates may include one or more of: a summary mode display template, a standard mode display template, and a detail view mode display template.

In another implementation, a computing system includes at least one processor and at least one memory architecture coupled with the at least one processor. A first software module is executed on the at least one processor and the at least one memory architecture. The first software module is configured to define text to be included within a first text message. A second software module is executed on the at least one processor and the at least one memory architecture. The second software module is configured to assign one or more tags to the first text message. The one or more tags are chosen from a plurality of available tags. A third software module is executed on the at least one processor and the at least one memory architecture. The third software module is configured to transmit the first text message, including the text and the one or more tags, to one or more recipients.

One or more of the following features may be included. The one or more tags may include a metadata-based tag. The plurality of available tags may include one or more of: a person tag, a handraise tag, a chat tag, a minute tag, a question tag, and a scribe tag. A plurality of text messages may be displayed. The plurality of text messages may include the first text message. The plurality of text messages may be filtered in accordance with one or more of the plurality of available tags. At least a portion of the plurality of text messages may be displayed using a display template, wherein the display template is chosen from a plurality of available display templates. The plurality of available display templates may include one or more of: a summary mode display template, a standard mode display template, and a detail view mode display template.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
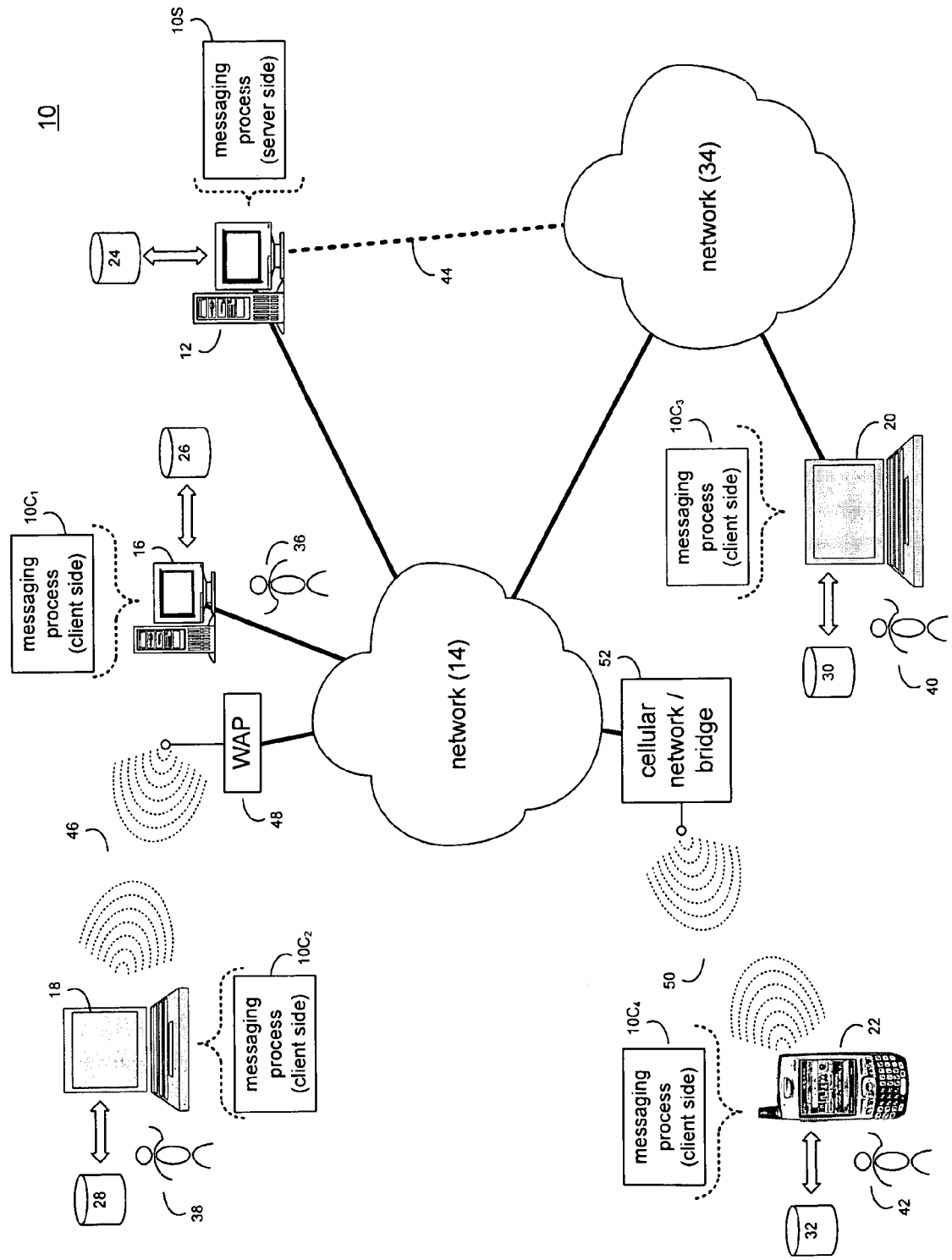
FIG. 1 is a diagrammatic view of a messaging process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java™, Smalltalk™, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown messaging process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, messaging process 10 may reside on a client electronic device, such as a personal computer, notebook computer, personal digital assistant, or the like.

Figure 2:
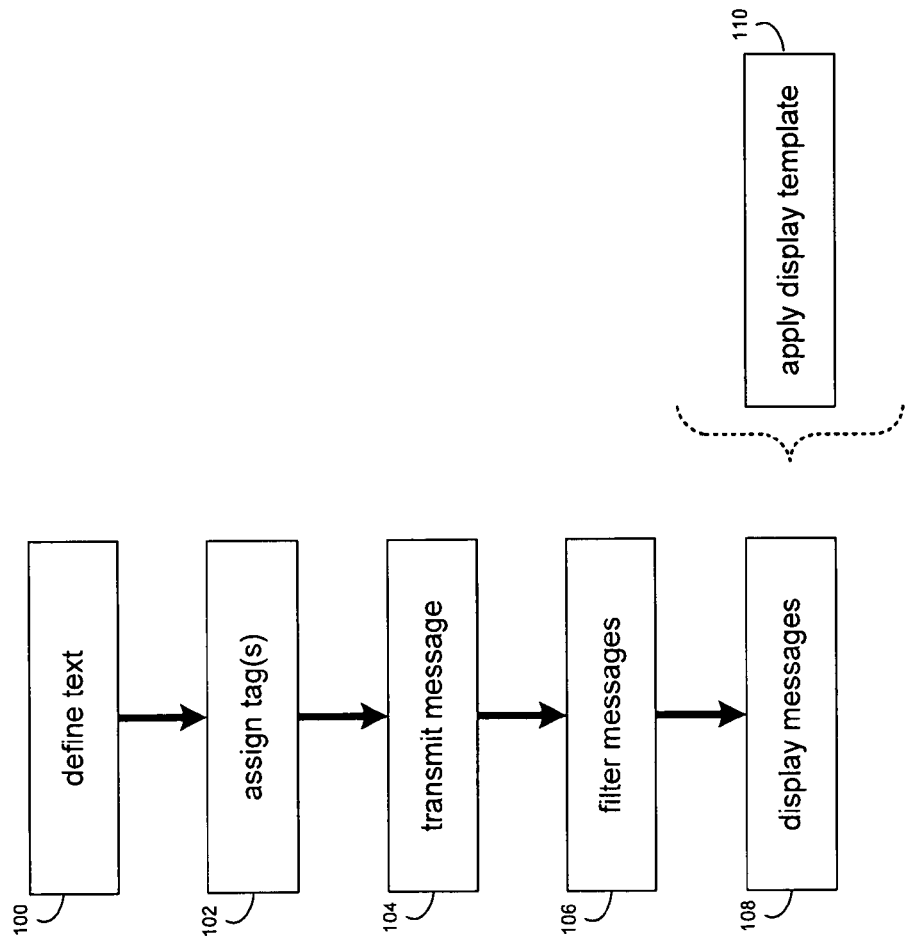
FIG. 2 is a flowchart of the messaging process of FIG. 1.

Referring also to FIG. 2 and as will be discussed below in greater detail, messaging process 10 may define 100 text to be included within a first text message. Further, messaging process 10 may assign 102 one or more tags to the first text message. The one or more tags may be chosen from a plurality of available tags. Messaging process 10 may transmit 104 the first text message, including the text and the tags, to one or more recipients.

Messaging process 10 may be a server-side process (e.g., server-side messaging process 10S) executed on server computer 12; a client side process (e.g., client-side messaging process $10C_1$, client-side messaging process $10C_2$, client-side messaging process $10C_3$, client-side messaging process $10C_4$) executed on a client electronic device (e.g., desktop computer 16, laptop computer 18, notebook computer 20, and personal digital assistant 22, respectively); or a hybrid server-side/client-side process that e.g., utilizes server-side messaging process 10S and at least one of client-side messaging process $10C_1$, client-side messaging process $10C_2$, client-side messaging process $10C_3$, and client-side messaging process $10C_4$ to effectuate the functionality of messaging process 10.

Additionally, messaging process 10 may incorporate all or a portion of a real-time online collaboration process, examples of which may include but are not limited to Microsoft Instant Messanger™, Lotus Sametime™, and WebEx™. Alternatively, messaging process 10 may be included within or a portion of (e.g., a plugin) of a real-time online collaboration process, examples of which may include but are not limited to Microsoft Instant Messanger™, Lotus Sametime™, and WebEx™.

The instruction sets and subroutines of server-side messaging process 10S, which may be stored on storage device 24 coupled to server computer 12, may be executed by one or more processors (not shown) and one or more memory architectures (not shown) incorporated into server computer 12. Storage device 24 may include but is not limited to: a hard disk drive; a tape drive; an optical drive; a RAID array; a random access memory (RAM); and a read-only memory (ROM).

The instruction sets and subroutines of client-side messaging process $10C_1$, which may be stored on storage device 26 coupled to desktop computer 16, may be executed by one or more processors (not shown) and one or more memory architectures (not shown) incorporated into desktop computer 16. Storage device 26 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of client-side messaging process $10C_2$, which may be stored on storage device 28 coupled to laptop computer 18, may be executed by one or more processors (not shown) and one or more memory architectures (not shown) incorporated into laptop computer 18. Storage device 28 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of client-side messaging process $10C_3$, which may be stored on storage device 30 coupled to notebook computer 20, may be executed by one or more processors (not shown) and one or more memory architectures (not shown) incorporated into notebook computer 20. Storage device 30 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of client-side messaging process $10C_4$, which may be stored on storage device 32 coupled to personal digital assistant 22, may be executed by one or more processors (not shown) and one or more memory architectures (not shown) incorporated into personal digital assistant 22. Storage device 32 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

Client electronic devices 16, 18, 20, 22 may each execute an operating system, examples of which may include but are not limited to Microsoft Windows™, Microsoft Windows CE™, Redhat Linux™, or a custom operating system.

Network 14 may be connected to one or more secondary networks (e.g., network 34), examples of which may include but are not limited to: a local area network; a wide area network; or an intranet, for example. Users 36, 38, 40, 42 may access server-side messaging process 10S directly through the device on which the client-side messaging process (e.g., client-side messaging processes $10C_1$, $10C_2$, $10C_3$, $10C_4$) is executed, namely client electronic devices 16, 18, 20, 22, for example. Users 36, 38, 40, 42 may access messaging process 10S directly through network 14 or through secondary network 34. Further, server computer 12 (i.e., the computer that executes messaging process 10S) may be connected to network 14 through secondary network 34, as illustrated with link line 44 (shown in phantom).

The various client electronic devices may be directly or indirectly coupled to network 14 (or network 34). For example, personal computer 16 is shown directly coupled to network 14 via a hardwired network connection. Further, notebook computer 20 is shown directly coupled to network 34 via a hardwired network connection. Laptop computer 18 is shown wirelessly coupled to network 14 via wireless communication channel 46 established between laptop computer 18 and wireless access point (i.e., WAP) 48, which is shown directly coupled to network 14. WAP 48 may be, for example, an IEEE 802.11a, 802.11b, 802.11g, Wi-Fi, and/or Bluetooth™ device that is capable of establishing wireless communication channel 46 between laptop computer 18 and WAP 48. Personal digital assistant 22 is shown wirelessly coupled to network 14 via wireless communication channel 50 established between personal digital assistant 22 and cellular network/bridge 52, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows e.g., mobile phones, computers, and personal digital assistants to be interconnected using a short-range wireless connection.

The Messaging Process

Figure 3:
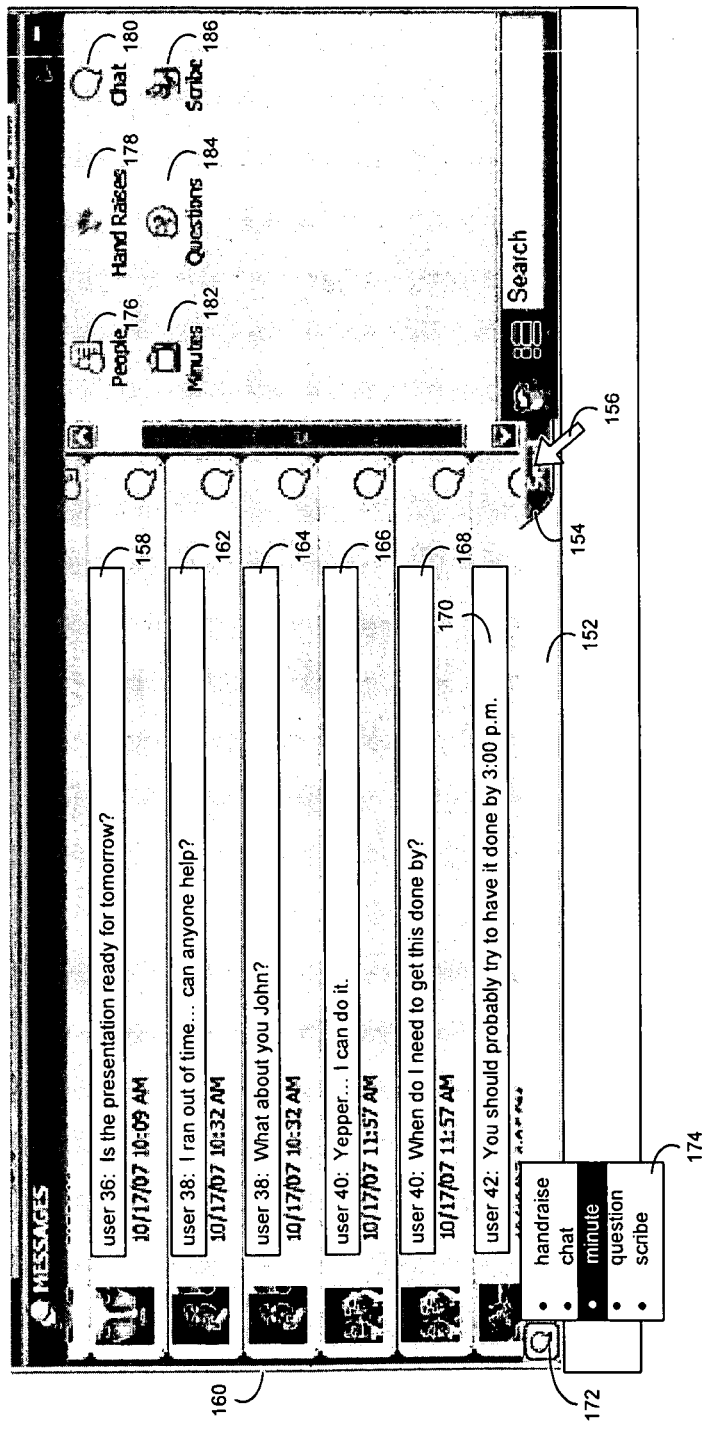
FIG. 3 is a diagrammatic view of a user interface rendered by the messaging process of FIG. 1.

As discussed above, messaging process 10 may define 100 text to be included within a first text message. Further, messaging process 10 may assign 102 one or more tags to the first text message. The one or more tags may be chosen from a plurality of available tags. Messaging process 10 may transmit 104 the first text message, including the text and the tags, to one or more recipients Referring also to FIG. 3, there is shown user interface 150 rendered by messaging process 10 that allows the functionality of messaging process 10 to be effectuated. Assume for illustrative purposes that user 36 is an engineering manager within a technology company that will soon be providing a presentation concerning a project that they have been working on. Further assume that user 36 wishes to determine the status of the presentation.

Accordingly, user 36 my wish to initiate an online dialog with his teammates, namely user 38, user 40 and user 42. Therefore, user 36 may define 100 text to be included within a text message that (in this example) initiates the online discussion. As such, user 36 may type the message "Is the presentation ready for tomorrow?" with data entry field 152. Once completed, user 36 may select "send" button 154 using onscreen pointer 156, resulting in the transmission 104 of message 158 to users 38, 40, 42. Onscreen pointer 156 may be controllable by a pointing device (e.g., a mouse; not shown).

As this is the first time that user 36 is transmitting 104 a message within this discussion, messaging process 10 may automatically assign 102 a "people" tag to message 158. As messaging process 10 allows one or more tags to be assigned 102 to individual messages within a discussion, the messages within the discussion may be filtered 106 based upon these tags, as will de discussed below in greater detail.

For this particular example, we will discuss six (6) tags, namely: a "person" tag, a "handraise" tag, a "chat" tag, a "minute" tag, a "question" tag, and a "scribe" tag. However, the specific types of tags discussed are for illustrative purposes only and are not intended to be a limitation of this disclosure, as the number and/or type of tags may be adjusted based upon the needs of the users and the design criteria of messaging system 10. Concerning the above-stated six (6) illustrative examples, exemplary meanings may be as follows:

The "person" tag: The "person" tag may be automatically assigned 102 (by messaging process 10) only the first time that a user contributes to a particular discussion. Accordingly, by filtering to only see those messages that have a "person" tag, a non-redundant list of discussion contributors may be generated.

The "handraise" tag: The "handraise" tag may be assigned 102 (by a user) when the user would like to get the attention of the online discussion. Accordingly, by filtering to only see those messages that have a "handraise" tag, a list of specific sub-discussions may be generated.

The "chat" tag: The "chat" tag may be assigned 102 (by a user) when the user has a message that they would like to discuss in greater detail. Accordingly, by filtering to only see those messages that have a "chat" tag, a list of messages needing enhanced discussion may be generated.

The "minute" tag: The "minute" tag may be assigned 102 (by a user) when the user feels that a message should be memorialized within the minutes of the discussion. Accordingly, by filtering to only see those messages that have a "minute" tag, a list of items that should be defined within the discussion minutes may be generated.

The "question" tag: The "question" tag may be assigned 102 (by a user) when the user has a question that they would like to have answered. Accordingly, by filtering to only see those messages that have a "question" tag, a list of questions may be generated.

The "scribe" tag: The "scribe" tag may be assigned 102 (by a user) when the user feels that the particular message should be supplemented for use by a person who has a disability. For example, a text-based message may be converted to a voice-based message via a text-to-speech conversion program.

The above-described tags may be metadata-based tags that are appended to the message(s) prior to transmission 104 of the message. Once message 158 is displayed 108 within message window 160 of user interface 150 (which is viewable by each of users 36, 38, 40, 42 on the display screens of client electronic devices 16, 18, 20, 22, respectively), users 38, 40, 42 may respond to the inquiry of user 36 (i.e., message 158). Assume that user 38 is the first to respond to user 36, defining 100 text-based message 162 that states that "I ran out of time . . . can anyone help?" As this is the first message transmitted 104 by user 38 within this discussion, messaging process 10 may automatically assign 102 a "people" tag to message 162.

Assume that user 38 remembers that user 40 should have some spare time to finish the presentation. Accordingly, user 38 may define 100 and transmit message 164 to users 36, 40, 42, asking "What about you John?" (i.e., user 40). As this is not the first message transmitted 104 by user 38 within this discussion (i.e., message 162 was the first message of user 38), messaging process 10 may not automatically assign 102 a "people" tag to message 164. However, as this is an important message within this discussion, user 38 may assign 102 (via messaging process 10) a "minute" tag to message 164 so that the inquiry by user 38 concerning the ability of user 40 to work on the presentation may be included within the minutes of the discussion. Further, as this is a question, user 38 may assign 102 (via messaging process 10) a "question" tag to message 164.

Assume that user 40 (i.e., John), upon reading message 164, defines 100 message 166, which states "Yepper, I can do it." As message 166 is the first message transmitted 104 by user 40 within this discussion, messaging process 10 may automatically assign 102 a "people" tag to message 166. Further, as this is an important message that probably should be included within the minutes of this discussion, user 40 may assign 102 (via messaging process 10) a "minute" tag to message 166.

Assume that user 40 makes a general inquiry (in the form of message 168) concerning when the presentation needs to be done. As message 168 is not the first message transmitted 104 by user 40 within this discussion, messaging process 10 may not automatically assign 102 a "people" tag to message 168. However, as this is a question, user 40 may assign 102 (via messaging process 10) a "question" tag to message 168.

Assume that user 42, upon reading message 168, defines 100 message 170, which states "You should probably try to have it done by 3:00 p.m." As message 170 is the first message transmitted 104 by user 42 within this discussion, messaging process 10 may automatically assign 102 a "people" tag to message 170. Further, as this is an important message that probably should be included within the minutes of this discussion, user 42 may assign 102 (via messaging process 10) a "minute" tag to message 170.

Upon reading message 170, user 38 may define 100 the text "That is great . . . thanks a lot guys!" within data entry field 152. When assigning 102 tags to a message, the user may select from a plurality of available tags (e.g., the "handraise" tag, the "chat" tag, the "minute" tag, the "question" tag, and the "scribe" tag). As this is not the first message transmitted 104 by user 36 within this discussion (i.e., message 158 was the first message of user 36), messaging process 10 may not automatically assign 102 a "people" tag to the message being defined within data entry field 152. However, as this is an important message that probably should be included within the minutes of this discussion, user 36 may assign 102 (via messaging process 10) a "minute" tag to the message being defined 100 within data entry field 152.

When assigning 102 tags to messages, the user may select (via onscreen pointer 156) tag button 172 resulting in messaging process 10 rendering tagging menu 174 from which the user may select the appropriate tag(s) to associate with the message being defined 100.

As discussed above, the messages (e.g., messages 158, 162, 164, 166, 168, 170) displayed 108 within message window 160 of user interface 150 may be filtered 106 in accordance with the available tags (e.g., the "person" tag, the "handraise" tag, the "chat" tag, the "minute" tag, the "question" tag, and the "scribe" tag). Such filtering 106 may occur by selecting one or more of filtering buttons 176, 178, 180, 182, 184, 186. Depending upon the manner in which messaging process 10 is configured, selecting multiple filtering buttons may result in the displaying 108 of messages within message window 160 that e.g., include any of the associated tags or all of the associated tags.

The messages displayed 108 within message window 160 of user interface 150 may be displayed 110 using a display template (i.e., chosen from a plurality of available display templates). Examples of such display templates may include but are not limited to: a summary mode display template (e.g., a display mode that displays a minimum level of information), a standard mode display template (e.g., a display mode that displays a standard level of information), and a detail view mode display template (e.g., a display mode that displays an enhanced level of information).

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   defining, via a computing device, text to be included within a first text message;
   assigning, via the computing device, one or more tags to the first text message, wherein the one or more tags are chosen from a plurality of available tags, and wherein the plurality of available tags are defined before the text to be included within the first text message is defined; and
   transmitting, via the computing device, the first text message, including the text and the one or more tags, to one or more recipients;
   wherein the plurality of tags includes one or more of a handraise tag, a chat tag, a minute tag, and a scribe tag, and wherein at least one of:
      the handraise tag is assigned to a message when a user indicates an intention to focus the attention of participants of an online discussion on the message;
      the chat tag is assigned to a message when a user indicates an intention to discuss the message in greater detail;
      the minute tag is assigned to a message when a user indicates that the message should be memorialized within minutes associated with the online discussion;
      the scribe tag is assigned when the user indicates that the message should be supplemented for ease of use by a user with a disability.

2. The method of claim 1 wherein the one or more tags include a metadata-based tag.

3. The method of claim 1 further comprising:
   displaying a plurality of text messages, and wherein the plurality of text messages includes the first text message.

4. The method of claim 3 further comprising:
   filtering the plurality of text messages in accordance with one or more of the plurality of available tags.

5. The method of claim 3 wherein displaying a plurality of text messages includes displaying at least a portion of the plurality of text messages using a display template, wherein the display template is chosen from a plurality of available display templates.

6. The method of claim 5 wherein the plurality of available display templates includes one or more of: a summary mode display template, a standard mode display template, and a detail view mode display template.

7. The method of claim 3, further comprising:
   in response to receiving a selection of one or more filtering buttons, each filtering button corresponding to one of the one or more tags chosen from the plurality of available tags, filtering the plurality of text messages in accordance with the selection of the one or more filtering buttons.

8. The method of claim 1 wherein the plurality of tags includes one or more of: a person tag, and a question tag and wherein at least one of:
   the person tag is automatically assigned to a message the first time that a user contributes to an online discussion; and
   the question tag is assigned when a user indicates that the user has a question associated with a message that the user would like answered.

9. The method of claim 1 wherein the plurality of available tags are independent of subject matter associated with the first text message.

10. A computer program product residing on a non-transitory computer readable medium having a plurality of instructions stored thereon, which, when executed by a processor, cause the processor to perform operations comprising:
    defining text to be included within a first text message;
    assigning one or more tags to the first text message, wherein the one or more tags are chosen from a plurality of available tags, and wherein the plurality of available tags are defined before the text to be included within the first text message is defined; and
    transmitting the first text message, including the text and the one or more tags, to one or more recipients;
    wherein the plurality of tags includes one or more of a handraise tag, a chat tag, a minute tag, and a scribe tag, and wherein at least one of:
       the handraise tag is assigned to a message when a user indicates an intention to focus the attention of participants of an online discussion on the message;
       the chat tag is assigned to a message when a user indicates an intention to discuss the message in greater detail;

the minute tag is assigned to a message when a user indicates that the message should be memorialized within minutes associated with the online discussion;

the scribe tag is assigned when the user indicates that the message should be supplemented for ease of use by a user with a disability.

11. The computer program product of claim 10 wherein the one or more tags include a metadata-based tag.

12. The computer program product of claim 10 further comprising instruction for:

displaying a plurality of text messages, and wherein the plurality of text messages includes the first text message.

13. The computer program product of claim 12 further comprising instruction for:

filtering the plurality of text messages in accordance with one or more of the plurality of available tags.

14. The computer program product of claim 12 wherein the instructions for displaying a plurality of text messages include instructions for displaying at least a portion of the plurality of text messages using a display template, wherein the display template is chosen from a plurality of available display templates.

15. The computer program product of claim 14 wherein the plurality of available display templates includes one or more of: a summary mode display template, a standard mode display template, and a detail view mode display template.

16. The computer program product of claim 10 wherein the plurality of available tags are independent of subject matter associated with the first text message.

17. A computing system comprising:

at least one processor;

at least one memory architecture coupled with the at least one processor;

a first software module executed on the at least one processor and the at least one memory architecture, wherein the first software module is configured to define text to be included within a first text message;

a second software module executed on the at least one processor and the at least one memory architecture, wherein the second software module is configured to assign one or more tags to the first text message, wherein the one or more tags are chosen from a plurality of available tags, and wherein the plurality of available tags are independent of subject matter associated with the first text message; and a third software module executed on the at least one processor and the at least one memory architecture, wherein the third software module is configured to transmit the first text message, including the text and the one or more tags, to one or more recipients;

wherein the plurality of tags includes one or more of a handraise tag, a chat tag, a minute tag, and a scribe tag, and wherein at least one of:

the handraise tag is assigned to a message when a user indicates an intention to focus the attention of participants of an online discussion on the message;

the chat tag is assigned to a message when a user indicates an intention to discuss the message in greater detail;

the minute tag is assigned to a message when a user indicates that the message should be memorialized within minutes associated with the online discussion;

the scribe tag is assigned when the user indicates that the message should be supplemented for ease of use by a user with a disability.

18. The computing system of claim 17 wherein the one or more tags include a metadata-based tag.

19. The computing system of claim 17 further comprising:

a fourth software module executed on the at least one processor and the at least one memory architecture, wherein the fourth software module is configured to display a plurality of text messages.

20. The computing system of claim 17 wherein the plurality of available tags are defined before the text to be included within the first text message is defined.

* * * * *